US 6,550,401 B2

(12) United States Patent
Chiba

(10) Patent No.: US 6,550,401 B2
(45) Date of Patent: Apr. 22, 2003

(54) REFERENCE TABLE TILTING MECHANISM

(75) Inventor: Jiro Chiba, Hotaka-machi (JP)

(73) Assignee: Harmonic Drive Systems, Inc., Tokyo (JP)

(*) Notice: Subject to any disclaimer, the term of this patent is extended or adjusted under 35 U.S.C. 154(b) by 69 days.

(21) Appl. No.: 09/862,493

(22) Filed: May 23, 2001

(65) Prior Publication Data

US 2002/0008185 A1 Jan. 24, 2002

(30) Foreign Application Priority Data

May 24, 2000 (JP) ........................................ 2000-152231

(51) Int. Cl.[7] .................................................. A47F 5/12
(52) U.S. Cl. ............................................ 108/7; 108/20
(58) Field of Search .................... 108/7, 20, 1; 244/242, 244/371, 398, 188.1, 188.2

(56) References Cited

U.S. PATENT DOCUMENTS

| 5,150,627 A | * | 9/1992 | Lindsay |
| 5,340,076 A | * | 8/1994 | Dockwiller, III |
| 5,605,101 A | * | 2/1997 | Lindsay |
| 5,657,956 A | * | 8/1997 | Smith et al. |
| 6,095,476 A | * | 8/2000 | Mathis |
| 6,273,389 B1 | * | 8/2001 | Carigren |

FOREIGN PATENT DOCUMENTS

JP             63-295166        *  5/1987

* cited by examiner

Primary Examiner—Jose V. Chen
(74) Attorney, Agent, or Firm—Burns, Doane, Swecker & Mathis, L.L.P.

(57) ABSTRACT

A reference table tilting mechanism has a reference table which is supported by a plate spring and is adjusted of its angle of inclination by first and second angle adjusting machines constituted by an eccentric cam mechanism. Angles of inclination of the reference table in first and second directions are detected by first and second inclination angle sensors. Based on the detected angles by these sensors, the respective angle adjusting machines are feed-back controlled to make the angle of inclination of the reference table to be a desired one in each direction. Whereby, such a reference table tilting mechanism can be realized that has a simplified structure and a high rigidity, and is manufactured at a low price.

8 Claims, 5 Drawing Sheets

REFERENCE TABLE TILTING MECHANISM

BACKGROUND OF THE INVENTION

1. Field of the Invention

This invention relates to a reference table tilting mechanism for setting a reference table to have a desired angle of inclination, and in particular to a reference table tilting mechanism which is designed to have a simplified structure and a high rigidity, and to manufacture at a low cost.

2. Related Art Description

The conventional manual operating reference table tilting mechanism has a reference table whose inclination angles of x and y directions are adjusted manually with using a track level. While, there has also been known an automatic reference table tilting mechanism which is typically constituted to have an inclination detecting sensor (one-dimensional or two-dimensional sensor) mounted on a reference table, a servo controller and a servo actuator for tilting the reference table. The servo controller is provided with an output of the sensor and an input signal representing a desired angle, and, based on the difference between the two parameters, controls the servo actuator. A linear type actuator is used as the servo actuator.

An object of this invention is to provide a reference table tilting mechanism which is constituted to have a single reference table, so that it has a simplified structure and a high rigidity, and can be manufactured at a low price in comparison with the conventional reference table tilting mechanisms.

Further, an object of this invention is to provide a reference tilting mechanism which employs an eccentric cam type mechanism as a servo actuator for adjusting an angle of inclination of a reference table instead of a linear type actuator, whereby a driving portion thereof can be made to have a high torque amplification and can be manufactured at a low price.

SUMMARY OF THE INVENTION

In order to solve the above and other objects, a reference table tilting mechanism according to this invention comprises a reference table, first and second eccentric cam type angle adjusting means for adjusting an angle of inclination of the reference table, and a spring means for supporting the reference table.

The first eccentric cam type angle adjusting means has an eccentrically rotatable first disc shaped cam, a contact point of which with the reference table is designed to move vertically with respect to the reference table as the first disc shaped cam is rotated eccentrically. Likewise, the second eccentric cam type angle adjusting means has an eccentrically rotatable second disc shaped cam, a contact point of which with the reference table is located different from that of the first disc shaped cam and moves vertically with respect to the reference table as the second disc shaped cam is eccentrically rotated.

The spring means supports the reference table at a point which is located different from each of the contact points of the first and second disc shaped cams.

In a preferred embodiment, the spring means presses the reference table against the first and second disc shaped cams with a predetermined resilient force. With this constitution, since the first and second eccentric cam type angle adjusting means are applied with a pre-load, backlash thereof can be eliminated to realize a high accurate tilting adjustment.

Typically, the reference table tilting mechanism comprises a first angle sensor for detecting an angle of inclination in a first direction of the reference table, and a second angle sensor for detecting an angle of inclination thereof in a second direction of the reference table, the first and second directions being different from each other. Further, it has a control means for controlling to drive the first and second eccentric cam type angle adjusting means in accordance with detected angles by the first and second angle sensors so that the reference table is adjusted to have a desired angle of inclination.

DETAILED DESCRIPTION OF THE PREFERRED EMBODIMENT

Figure 1A:
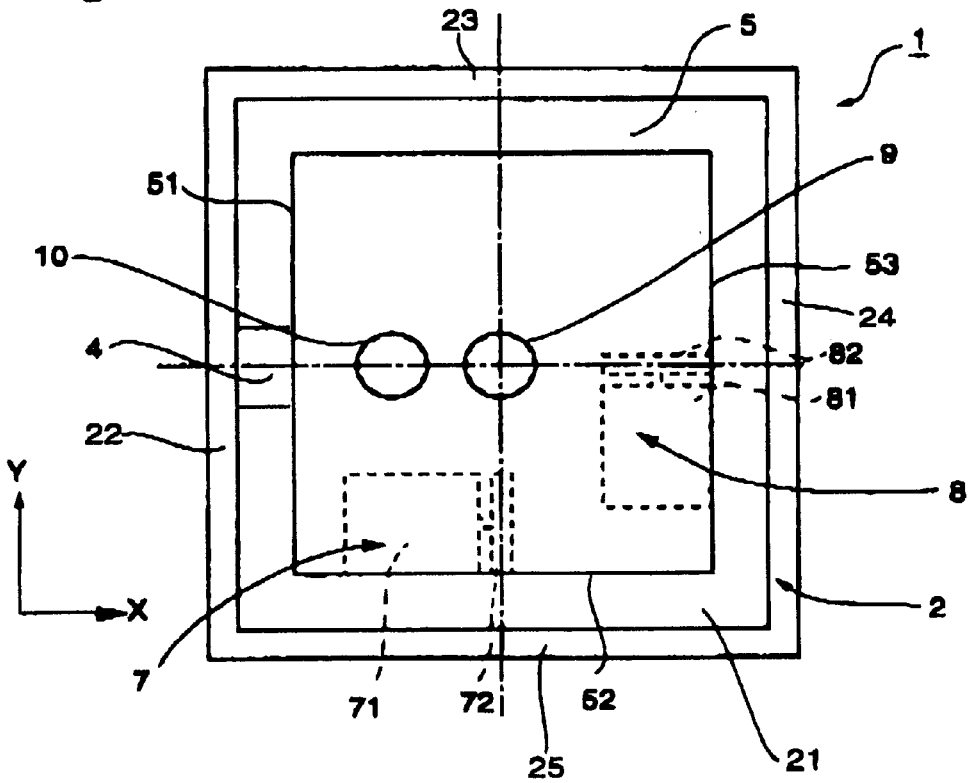
FIGS. 1A and 1B show schematically a planar structure and a sectional one of an example of a reference table tilting mechanism according to this invention.

Referring now to the drawings, examples of a reference table tilting mechanism according to this invention will be described.

Figure 1B:
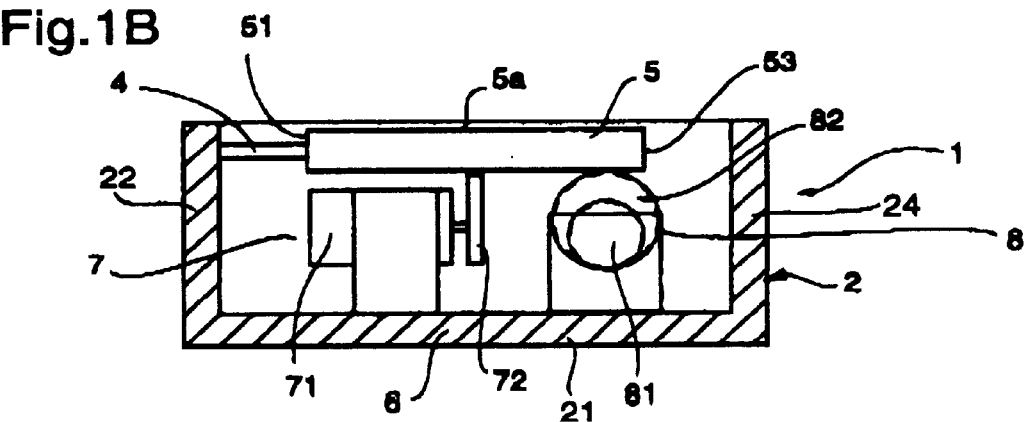

As shown in FIGS. 1A and 1B wherein a planar structure and a sectional one of an example of a reference table tilting mechanism are illustrated, a reference table tilting mechanism 1 of this example has a rectangular base assembly 2 having a bottom portion 21 and side wall portions 22, 23, 24 and 25 extending perpendicularly from the outer edges of the base portion 21. The side wall portion 22 is provided at its upper side with a plate spring 4 which has a constant width and extends horizontally. A reference table 5 is supported horizontally on the end portions of the plate spring 4.

The reference table 5 is a rectangular plate with a constant thickness and has a reference table surface 5a. Under the reference table 5, a first angle adjusting machine 7 and a second angle adjusting machine 8 are mounted on the base portion 21 of the base assembly 2. There are also provided a first inclination angle sensor 9 for detecting the angle of inclination of the reference table 5 from the horizontal line in a first direction Y, and a second inclination angle sensor 10 for detecting the angle of inclination of the reference table surface 5a from the horizontal line in a second direction X perpendicular to the direction Y.

The first angle adjusting machine 7 has a servo motor 71 and a first disc shaped cam 72 mounted on the end of an output shaft of the motor 71 in an eccentric state. Similarly, the second angle adjusting machine B has a servo motor 81 and a second disc shaped cam 82 mounted on the end of an output shaft of the motor 81. These first and second disc shaped cams 72 and 82 are maintained in a state contacting with the rear surface of the reference table 5.

Figure 2:
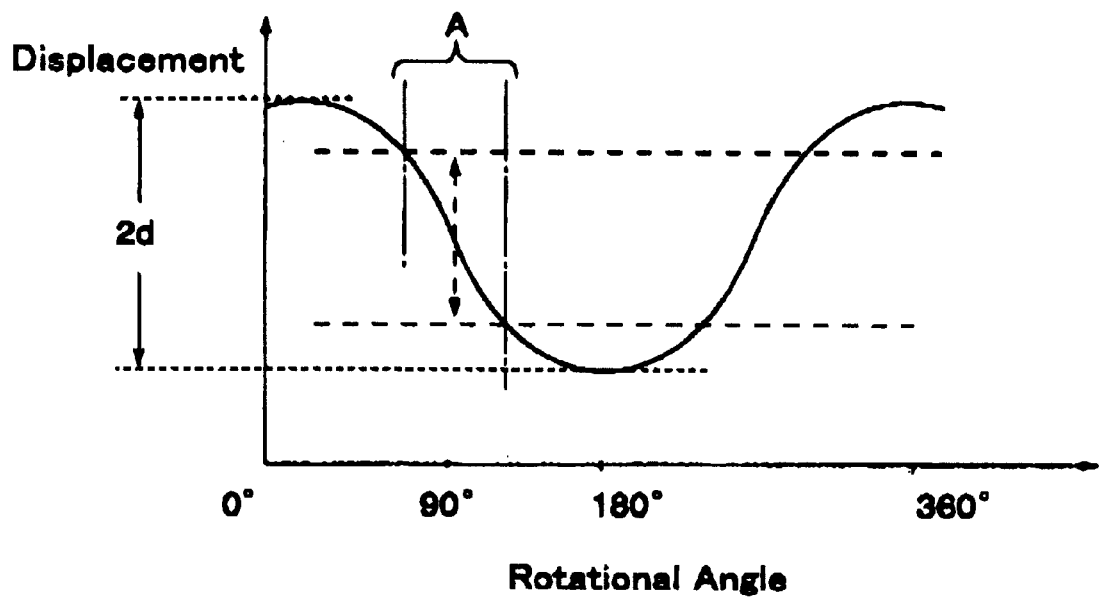
FIG. 2 is a graph illustrating a moving locus of a contact point of a disc shaped cam of an eccentric cam mechanism with a reference table in FIG. 1.

FIG. 2 is a graph showing a moving locus of a contact point of these disc shaped cams 72 and 82 where these cams are contacted with the rear surface of the reference table 5. As shown by this graph, the locus of the contact point is a sine curve having an amplitude of 2d where d is an amount of eccentricity of the disc shaped cams. Thus, the portions of the reference table 5 where the disc shaped cams 72 and 82 are contacted, move up and down with an amplitude of 2d. It is noted that a practically usable portion of the locus is that designated by A and can be regarded as a straight line. Since the angle of the reference table 5 is adjusted by means of a feed back control according to the outputs of the sensors 9 and 10, the linearity of the locus portion A does not any adverse affect on the angle adjustment accuracy of the reference table tilting mechanism 1.

Referring back to FIG. 1A, there will be explained the positional relationship between the respective disc shaped cams 72,82 and the sensors 9,10. The plate spring 4 is connected to a center portion of a side surface 51 of the reference table 5 in the direction Y. The disc shaped cam 72 of the first angle adjusting machine 7 has a rotational center line parallel to the second direction X and is in contact with the center portion of the rear surface of the reference table 5 in the first direction Y. The sensors 9 and 10 are located on a straight line passing through the center of the plate spring 4 and the contact point of the disc shaped cam 82, the first inclination angle sensor 9 is at the center of the reference table 5, and the second inclination angle sensor 10 is between the first inclination angle sensor 9 and the plate spring 4.

Figure 3:
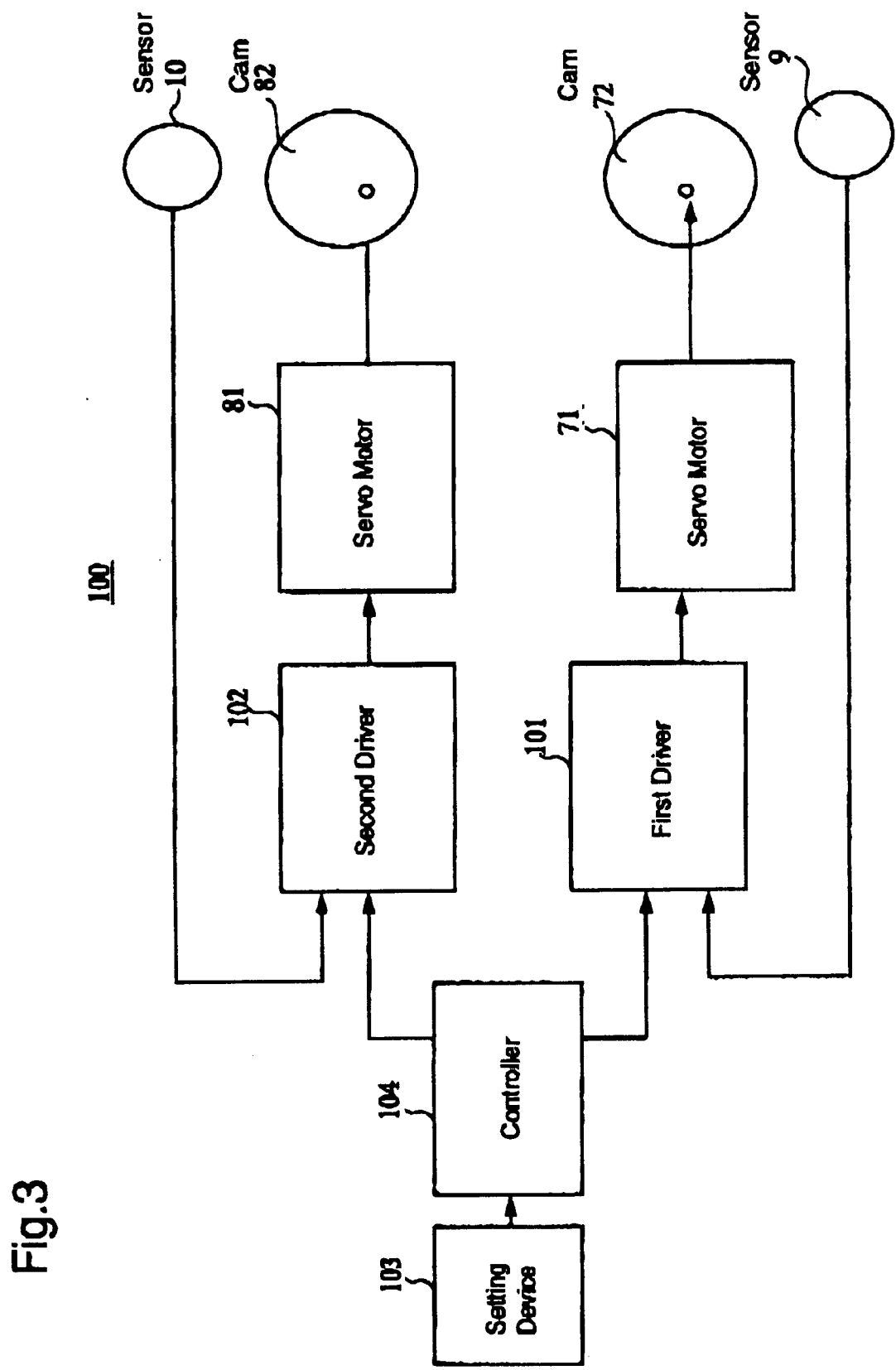
FIG. 3 is a schematic block diagram showing a drive controlling system of the reference table tilting mechanism of FIG. 1, FIGS. 4A and 4B show schematically a planar structure and a sectional structure of another example of the reference table tilting mechanism of this invention.

FIG. 3 is a schematic block diagram showing a servo control system of the reference table tilting mechanism 1. A servo control system 100 of this example has a first driver 101 for driving the servo motor 71 of the first angle adjusting machine 7, and a second driver 102 for driving the servo motor 81 of the second angle adjusting machine 8. The first driver 101 drives the servo motor 71 to adjust the first angle of inclination of the reference table 5 to become a first setting inclination angle in the first direction Y, based on an angle input signal provided via a controller 104 from a setting device 103, through which an desired inclination angle of the reference table 5 can be input, and based on the detected output from the first inclination angle sensor 9. Likewise, the second driver 102 drives the servo motor 81 to adjust the second inclination angle of the reference table 5 to become a second setting inclination angle in the second direction X, based on the angle input signal via the controller 104 from the setting device 103 and the detected output from the second inclination angle sensor 10.

According to the reference table tilting mechanism 1 of this example, the reference table 5 is supported two-dimensionally by the plate spring 8 and is moved vertically by the first and second angle adjusting machine 7 and 8 constituted by the eccentric cam mechanism, whereby the angle of inclination of the reference table in the directions Y and X can be feed-back controlled to become desired ones.

Therefore, the structure of the mechanism 1 can be simplified, the rigidity thereof can be enhanced, and the manufacturing cost can be reduced, in comparison with the conventional multi-stage table mechanism or that having a linear type actuator. Especially, since the eccentric cam mechanism is employed, the torque amplification of the mechanism 1 can be increased, and the driving portion thereof can be simplified and manufactured at a low price, compared to the conventional liner type actuator.

In addition, in this example, the plate spring 4 is used to constantly press the reference table 5 against the eccentric cam mechanism with a prescribed resilient force, in other words, the eccentric cam mechanism is applied with a predetermined pre-load. As a result, the driving portion constituted by the eccentric cam mechanism and the servo motor can be removed of its backlash, whereby the accuracy of angle adjustment can be improved.

Figure 4A:
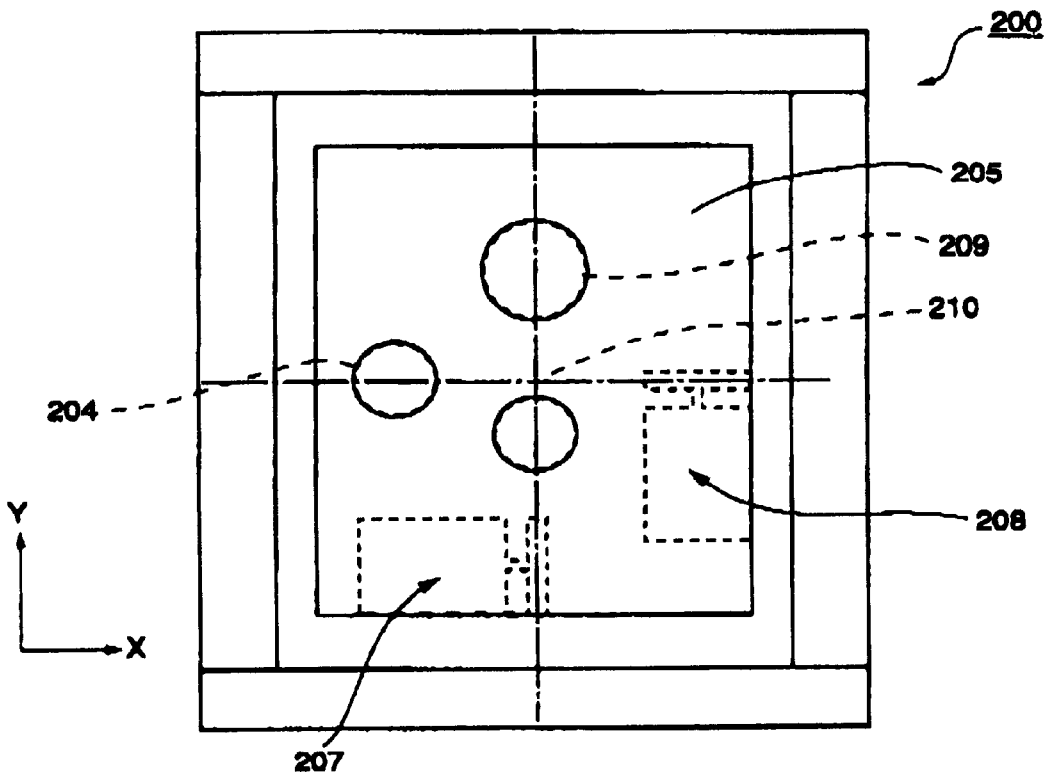
Figure 4B:
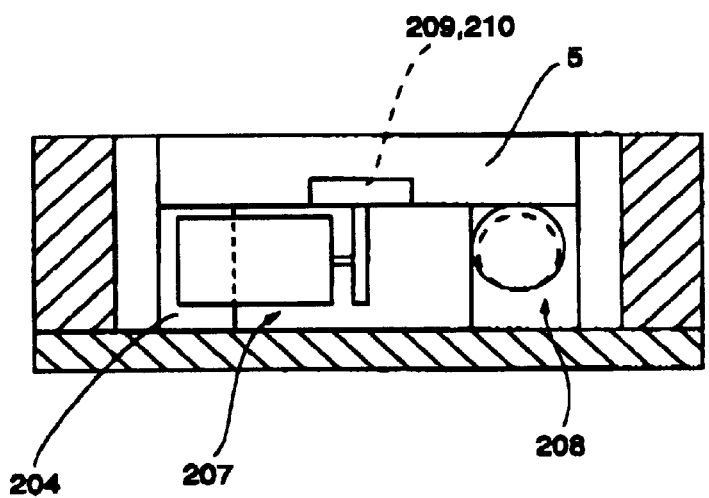

Next, FIGS. 4A and 4B show planar structure and sectional structure of a reference table tilting mechanism of another example according to this invention. A reference table tilting mechanism 200 of this example has also a reference table 205, an eccentric cam type angle adjusting machine 207, an eccentric cam type angle adjusting machine 208, a first inclination angle sensor 209, and a second inclination angle sensor 210. The reference table 205 is supported by a torsion spring 204 instead of a plate spring.

The torsion spring 204 supports the reference table 205 at a middle portion of the rear surface thereof in the direction Y and adjacent to the side of the table, and the positions of the first and second angle adjusting machines 207 and 208 are the same as those of the corresponding sensors 7 and 8 of the above example. Whereas, the first inclination angle sensor 209 and the second inclination angle sensor 210 are positioned symmetrically with respect to the center of the reference table 205 in the first direction Y of the reference table 205.

Figure 5:
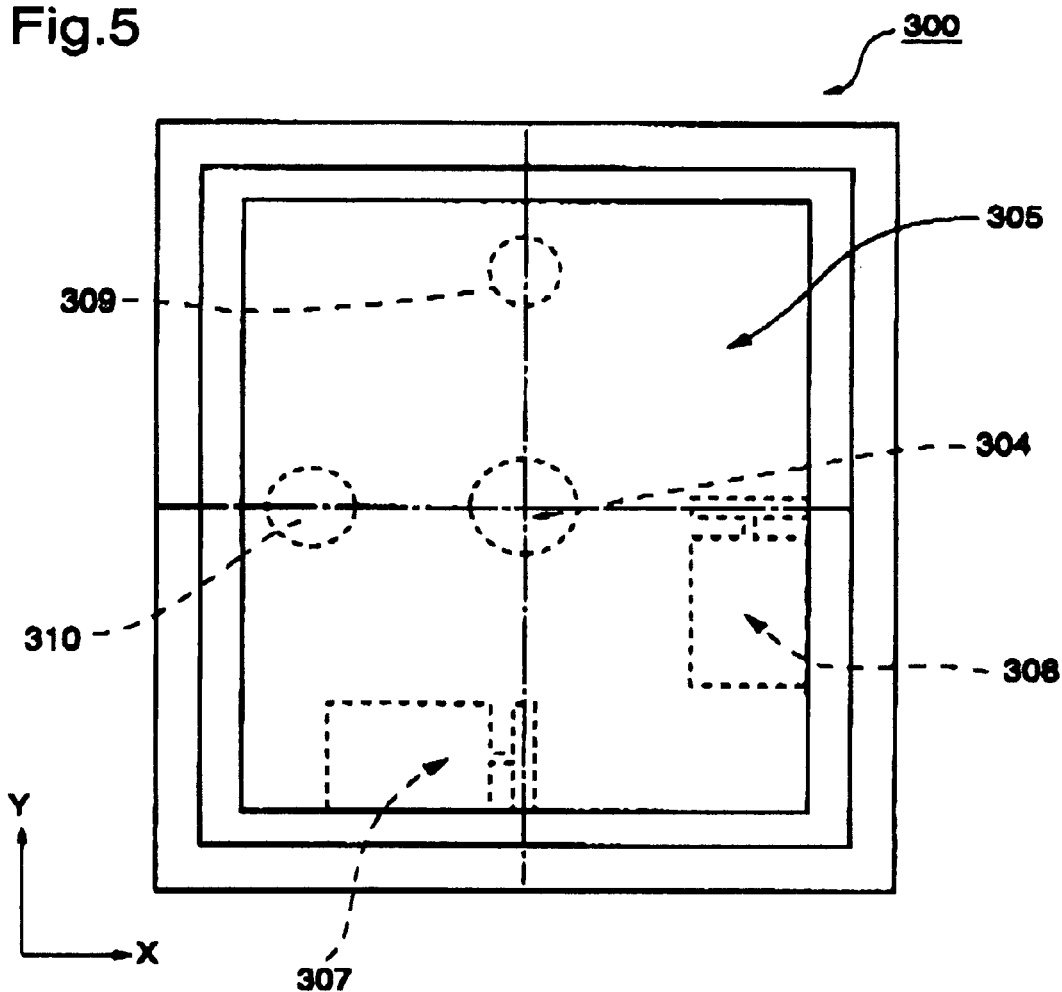
FIG. 5 shows schematically a planar structure of still another example of the reference table tilting mechanism of this invention.

FIG. 5 shows a planar structure of a reference table tilting mechanism of still another example according to this invention. The shown reference table tilting mechanism 300 has a reference table 305 which is supported at its rear surface center portion by a torsion spring 304. First and second angle adjusting machine 307 and 308 are the same as those of the above examples and are positioned at the same places as those of the above examples. Whereas, a second inclination angle sensor 310 is positioned at a place symmetrically to that of a table contact point of the second angle adjusting machine 308 with respect to the center of the reference table 305. A first inclination angle sensor 309 is also positioned at a place symmetrically to that of a table contact point of the first angle adjusting machine 307 with respect to the center of the reference table 305.

According to the reference table tilting mechanisms 200 and 300, the same effects and advantages can be obtained as those from the reference table tilting mechanism 1 of FIGS. 1 to 3.

As was explained above, the reference table tilting mechanism of this invention has the reference table which is supported by a spring means and is inclined by means of the first and second angle adjusting machines of eccentric cam type so as to have a desired angle of inclination. According to the reference table tilting mechanism of this invention, its structure can be simplified, its rigidity can be increased, and its manufacturing cost can be reduced, compared to the conventional mechanisms.

In particular, since the eccentric cam mechanism is employed, the torque amplification of the driving portion of the mechanism can be increased, the structure thereof can be simplified, and the manufacturing cost can also be reduced, compared to the conventional driving portion constituted by the linear type actuator.

In addition, the spring means for supporting the reference table is utilized to apply a preload on the eccentric cam type angle adjusting means to eliminate backlash, whereby the accuracy of angle adjustment of the reference table can be improved.

What is claimed is:

1. A reference table tilting mechanism comprising a reference table, first and second eccentric cam type angle adjusting means for adjusting an angle of inclination of the reference table, and a spring for supporting the reference table, wherein the first eccentric cam type angle adjusting means has an eccentrically rotatable first disc shaped cam which is in contact with the reference table and is arranged so that a first contact point between the first disc shaped cam and the reference table moves vertically as the first disc shaped cam is eccentrically rotated, the second eccentric cam type angle adjusting means has an eccentrically rotatable second disc shaped cam which is in contact with the reference table at a position different from the first contact point and is arranged so that a second contact point between the second disc shaped cam and the reference table moves vertically as the second disc shaped cam is eccentrically rotated, and the reference table is supported by the spring at a point which is different from the first and second contact points.

2. The reference table tilting mechanism according to claim 1, wherein the reference table is pressed against the first and second disc shaped cams with a predetermined resilient force by the spring.

3. The reference table tilting mechanism according to claim 1, further comprising a first inclination angle sensor for detecting an angle of inclination of the reference table in a first direction, and a second inclination angle sensor for detecting an angle of inclination of the reference table in a second direction which is different from the first direction.

4. The reference table tilting mechanism according to claim 3, further comprising a drive control means for controlling the first and second eccentric cam type angle adjusting means based on outputs of the first and second inclination angle sensors so that the angle of inclination of the reference table becomes a desired angle.

5. A reference table tilting mechanism comprising:
a reference table,
a first eccentric cam,
a second eccentric cam, and
a spring for supporting the reference table,
the first eccentric cam has an eccentrically rotatable first disc which is in contact with the reference table and is arranged so that a first contact point between the first disc shaped cam and the reference table moves vertically as the first disc is eccentrically rotated, the second eccentric cam has an eccentrically rotatable second disc which is in contact with the reference table at a position different from the first contact point and is arranged so that a second contact point between the second disc shaped cam and the reference table moves vertically as the second disc is eccentrically rotated, and the reference table is supported by the spring at a point which is different from the first and second contact points.

6. The reference table tilting mechanism according to claim 5, wherein the reference table is pressed against the first and second discs with a predetermined resilient force by the spring.

7. The reference table tilting mechanism according to claim 5, further comprising a first inclination angle sensor for detecting an angle of inclination of the reference table in a first direction, and a second inclination angle sensor for detecting an angle of inclination of the reference table in a second direction which is different from the first direction.

8. The reference table tilting mechanism according to claim 7, further comprising means for controlling the first and second eccentric cams based on outputs of the first and second inclination angle sensors so that the angle of inclination of the reference table becomes a desired angle.

* * * * *